United States Patent [19]
Gelbein

[11] Patent Number: 5,503,252
[45] Date of Patent: Apr. 2, 1996

[54] BICYCLE BRAKE ASSEMBLY

[76] Inventor: Mark Gelbein, 24 Gun La., Levittown, N.Y. 11756

[21] Appl. No.: 438,796

[22] Filed: May 11, 1995

[51] Int. Cl.$^6$ ..................................................... B62L 1/08
[52] U.S. Cl. ............................... 188/24.22; 188/24.19
[58] Field of Search ........................... 188/24.11, 24.12, 188/24.19, 24.21, 24.22; 403/83, 84, 87, 110

[56] References Cited

U.S. PATENT DOCUMENTS

| | | | |
|---|---|---|---|
| 3,776,333 | 12/1973 | Mathauser | 188/24.19 |
| 4,064,972 | 12/1977 | Ohtani et al. | 188/24.19 |
| 5,293,964 | 3/1994 | Li | 188/24.19 |
| 5,320,199 | 6/1994 | Miu | 188/24.19 |
| 5,413,193 | 5/1995 | Miller | 188/24.19 |
| 5,435,208 | 7/1995 | Chen | 74/570 |

OTHER PUBLICATIONS

TEKTRO Model 866A manufactured by Tektro Technology Corporation (copy of Tektro catalog page attached) Pre May 11, 1995.

Primary Examiner—Robert J. Oberleitner
Assistant Examiner—Chris Schwartz
Attorney, Agent, or Firm—Bauer & Schaffer

[57] ABSTRACT

A caliper type brake assembly for a bicycle is formed of a pair of arms each having an elongated slot at an intermediate portion and adapted to be mounted pivotally on the front fork of a bicycle frame. A ball clamp is mounted in a socket mounted on the arm and has a hole extending through the center thereof into which is slidably received a rod. A brake shoe having a front face provided with a brake pad is in turn mounted at its rear face at the end of the rod. The brake shoe is universally adjustable by sliding the rod within the ball and by moving the ball within its socket.

9 Claims, 2 Drawing Sheets

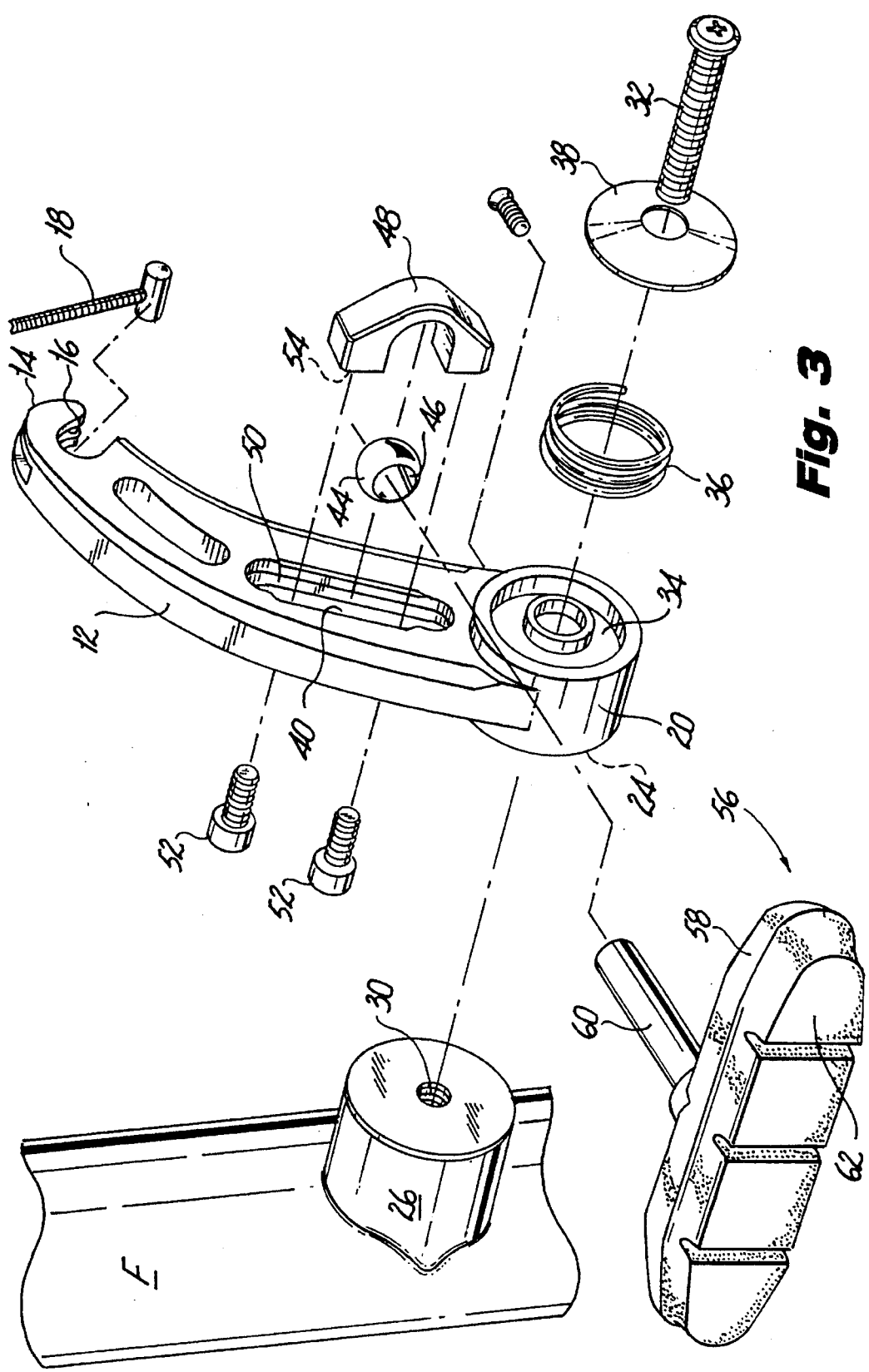

BICYCLE BRAKE ASSEMBLY

FIELD OF THE INVENTION

The present invention relates generally to bicycle brake assemblies and, more particularly, to a cantilever bicycle brake assembly having an adjustable shoe mounting structure.

BACKGROUND OF THE INVENTION

Conventional bicycles have long used caliper brakes. A typical prior art cantilever brake assembly comprises an upper brake cable attached to the operating hand, a lower brake cable attached to a pivotal actuating seat, a shoe and a packing. When the upper brake cable is pulled by the handle, the lower cable will also be pulled upwards. Hence, the actuating seat will be pulled to turn about a pin thereby forcing the shoe to press on the rim of the bicycle wheel.

Both center-pull and side-pull caliper brakes (e.g., position of the pivot) are known. Each type has encountered problems in that these tend to give an extremely mushy reaction during operation due to excessive flexing of the brake arms. Another problem has been that caliper type brakes have not afforded independent adjustment of the return spring force on each side of the rim.

There is yet another problem with brake shoe centering in caliper type brakes. Normally, the braking surfaces of the brake shoes are in parallel to the plane of the wheel but not to the arc of the wheel rim. The brake arms and the brake shoes are likely to deflect in the direction of rotation of the wheel rim when the braking surfaces are brought into contact with the wheel rim to apply a braking force. Such deflection causes the forward end of the braking surface, in the direction of rotation of the wheel rim, to separate from the wheel rim. On the other hand, the rear end of the braking surface comes into hard contact with the wheel rim. This results in uneven engagement of the braking surface with the wheel rim or in an improper application of the braking force. Also, the braking surface of the shoe body is unevenly worn to a considerable extent and is highly subject to damage.

An additional problem is that of obtaining adjustment of the brake shoe radially for alignment with the tire rim, rotationally along the axis of the brake caliper, and rotationally along the axis perpendicular to the caliper and to the plane of the tire. Also, inward adjustment toward the rim may be needed as the brake pad wears.

Various attempts at providing an adjustable brake shoe assembly have been made. In general, such attempts include "beefing up" and strengthening the various parts adding additional weight to the bicycle. Redundant clamps have also been used. Recently, the TEKTRO Technology Corporation of Taiwan, Republic of China, has marketed a brake assembly model 866A in which the rod on which the brake shoe is mounted is located in a ring having a rounded exterior. The ring is held in an "eye bolt" which is clamped to the brake lever. The "eye bolt" comprises a toroidal head and a threaded leg by which it is attached to the brake lever. The inner surface of the "eye" or head is curved to conforming to the outer surface of the ring thereby simulating a ball joint providing a degree of universal movement. The eye bolt is secured to the brake lever by having the threaded leg pass through the hole and securing a nut on the leg against the back surface of the lever. The problems with this construction are that upon tightening the nut, the single leg of the "eye bolt" is subjected to considerable torque so that the selected adjusted position of the shoe cannot be fixed during assembly. Similarly, during use the "eye bolt" is subjected to vibration and to the braking force of the brake shoe itself thereby causing a torque to be applied to the single nut. Consequently, the "eye bolt" will turn out of desired alignment. Furthermore, compression about the ring is not even or balanced as the "eye", when clamped, is elliptically distorted. As a result of all of this, effective, efficient and secure adjustment is not obtained.

The present invention overcomes these disadvantages inherent in the above-described prior art bicycle braking assemblies while also providing a cantilever braking assembly which is light in weight, inexpensive to manufacture, provides good braking and enables easy angular adjustment of a braking surface of a shoe body relative to a wheel rim, and easy adjustment of a clearance between the wheel rim and the brake shoe.

It is an object of the present invention to provide a cantilever brake assembly having an adjustable shoe mounting structure which facilitates the adjusting operation while ensuring a wide range of adjustments.

It is another object of the present invention is to further expand the freedom in adjusting the position or orientation of the brake shoe.

It is still another object of the present invention is to ensure reliable fixation of the brake shoes after positional adjustment.

It is still another object of the present invention to provide a cantilever brake assembly for a bicycle which is easy to assemble.

It is a further object of the present invention to provide a cantilever brake assembly for a bicycle which is simple in construction.

It is a further object of the present invention to provide a braking assembly for a bicycle which is economical to manufacture.

SUMMARY OF THE INVENTION

Briefly stated, the present invention comprises a caliper type brake assembly for a bicycle comprising a pair of arms each formed with an elongated slot at an intermediate portion and adapted to be mounted pivotally on the front fork of a bicycle frame. A split ring ball member is mounted in a socket mounted on the arm and has a hole extending through the center thereof into which is slidably received a rod. A brake shoe having a front face provided with a brake pad is in turn mounted at its rear face at the end of the rod. The brake shoe is universally adjustable by sliding the rod within the ball and by moving the ball within its socket. The ball is held in the socket by securing a U-shaped hasp to the arm over the ball to thus prevent the ball from torquing out of adjustment upon being secured.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 3 is an exploded view of a cantilever brake assembly according to the present invention.

DETAILED DESCRIPTION OF THE PREFERRED EMBODIMENT

Figure 1:
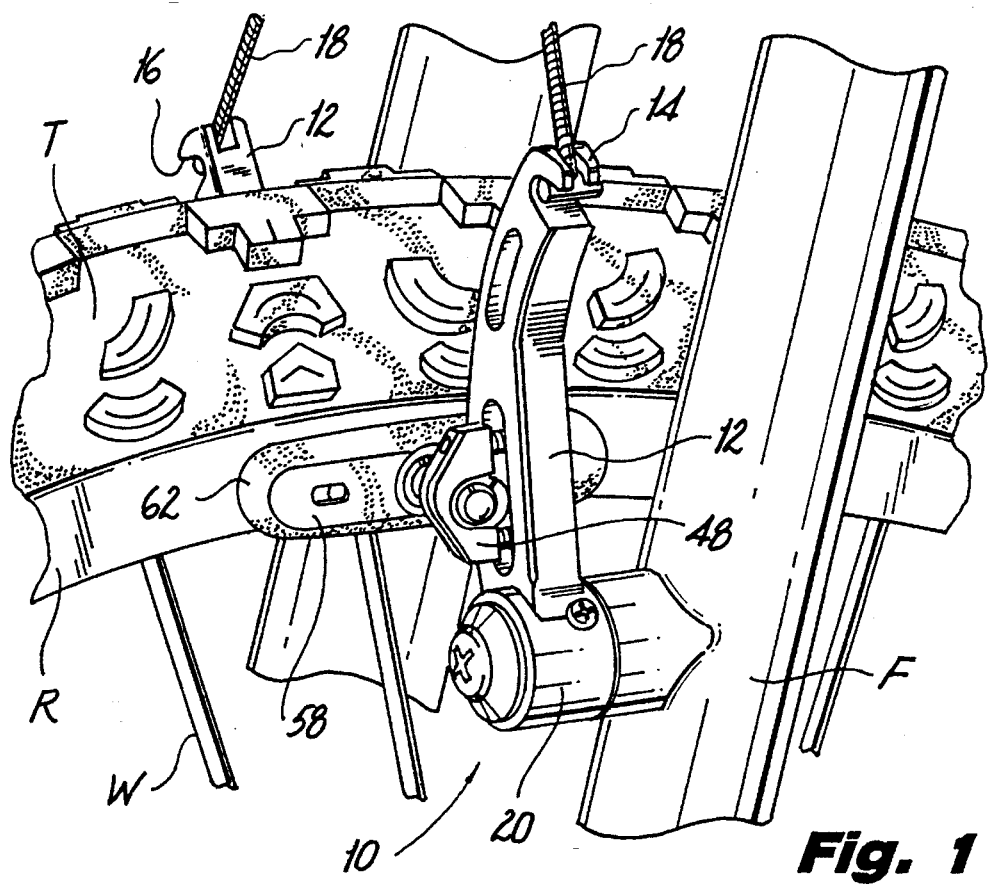
FIG. 1 is a fragmentary view in side elevation of the cantilever brake assembly of the present invention installed in a bicycle frame.

While this invention is susceptible of embodiments in many different forms, this specification and the accompanying drawings disclose only a specific form as an example of the use of the invention. The invention is not intended to be limited to the embodiment so described, and the scope of the invention will be pointed out in the appended claims.

Referring now to the drawings in detail, wherein like numerals are used to indicate like elements throughout, there is shown a cantilever brake assembly, generally designated 10, according to the present invention. The brake assembly 10 comprises a pair of curved brake arms 12 pivotally mounted on the frame F of the bicycle in opposition to the rim R of the wheel W.

The brake arm 12 has a slotted upper end 14 formed with a retaining notch 16 for receiving the lower brake cable 18, and an enlarged lower end 20 formed with a mounting socket 24 slidably fitting over a solid shaft 26 protruding forwardly from the front fork 28 of the bicycle parallel to the plane of the wheel. As will be apparent from FIG. 3, the mounting socket 24 protrudes as a hollow cylindrical hub from the inner face of the arm 12 so that when assembled over the shaft 26 is of a depth sufficient to receive a significant portion of the shaft ensuring stability as well as rotatability of the arm. The solid shaft 26 is provided with a centric threaded bore 30 into which a bolt 32 fits to pivotally secure the arm 12 to the bicycle. Further, as seen in FIG. 3, the front face of arm 14 is recessed about the threaded bore to define a hollow space 34 into which a helical torsion spring 36 is disposed normally bias the brake out of contact with the rim. A washer-like cover 38 is placed between the head of the bolt 32 and the surface of the arm 14 to close the space 34 and the torsion spring 36. The cover 38 and the recess are provided with suitable stops against which the ends of the helix forming the spring is operatively held.

The arm 12 is further formed at its intermediate portion with a longitudinal slot 40 having a curved inner periphery and into which a brake shoe clamp assembly 42 is mounted. The clamp assembly comprises a split ring 44 in the shape of a ball having a center hole 46. The ring 44 is held within a U-shaped hasp 48 against an inwardly directed flange-like shelf 50 formed on the inner perimeter of the slot 40. The hasp 48 is held by threaded bolts 52 passing through the slot 40 and screwed into suitable threaded holes 54 in the legs of the hasp 48. By tightening the bolts 52, the hasp is drawn toward the slot 40 forcing the ring 44 into compression against the curved edge of slot 40 to close the ring 44. When tightened, the heads of the bolts 52 seat against the back side of the shelf 50. Prior to full compression, the ring 44 may be adjustably positioned along the length of the slot 40. As is apparent, the ball-shaped ring 44 is capable of universal adjustment.

The brake shoe, generally depicted by the numeral 56, comprises a rigid metal Oblong body 58 from the rear face of which integrally extends a rod 60. On the front face of the oblong body there is secured, in known manner, a molded brake pad 62.

During assembly, the cover 38 is placed over the hollow space 34 with the spring unit 36 disposed therebetween. The threaded bolt 32 is inserted through the cover 38 and threaded into the threaded bore 30 of the support shaft 26 to mount the arm 12 to the front fork F of the bicycle. The rod 60 of the brake shoe 56 is then inserted into the hole 46 of the ball-shaped ring 44. Thereafter, the ball 44 is press-fitted into the curved inner surfaces of the hasp 48 and is then engaged with the slot 40 in the arm 12. Before the hasp is securely tightened to compress the ring 44 and hold the rod 60 of the brake shoe securely, the brake shoe assembly is adjusted in the selected position.

Figure 2:
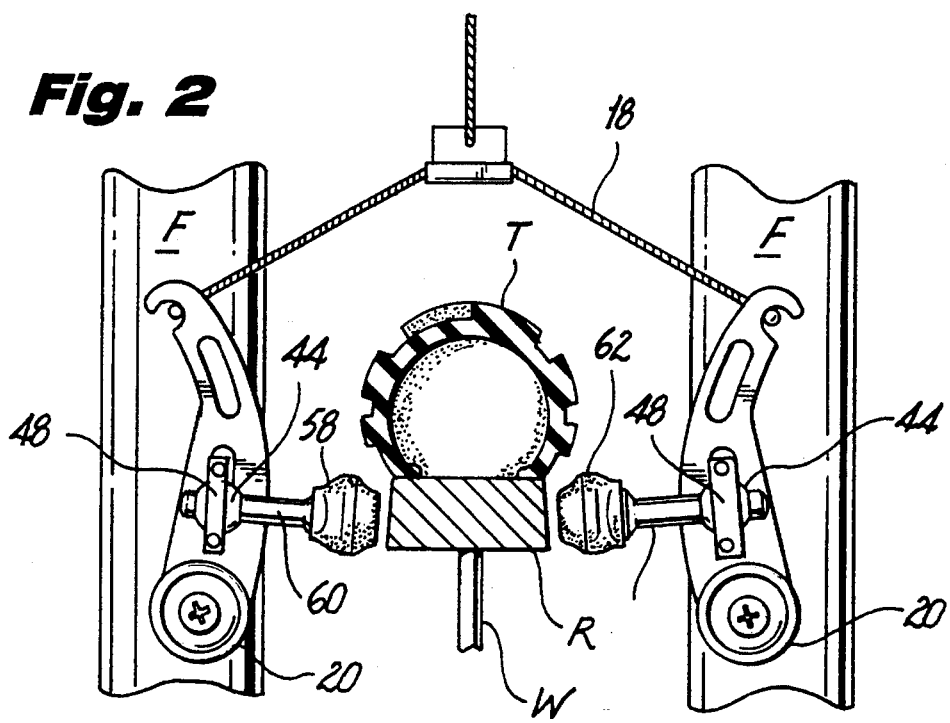
FIG. 2 is a fragmentary view in end elevation of a portion of the front fork of the bicycle frame of FIG. 1 embodying the cantilever brake assembly of the present invention.

As seen in FIG. 2, the brake assembly is finally installed on the frame F of the bicycle so that the brake pads 62 are in opposition to the rim R of the bicycle wheel with the axis 0—0 of the brake shoe rod 60 extending substantially perpendicularly to the plane of the wheel W. By this arrangement, the position of the brake shoe pad 62 can be adjusted linearly and rotationally along and about the axis 0—0. That is, as seen in FIGS. 1 and 2, the rod 60 is adjustable towards and away from the rim R to provide the brake shoe pad 62 with the proper spacing from the rim for maximum braking power for any one of different diameter wheels W. The ball-shaped ring 44 also permits the rod 60, and thus the brake pad 56, to be angularly adjustable from the initial axis as well as offset therefrom so that the brake pad 56 can always be properly aligned with the rim 62.

Because the ball 44 seats against the linear shelf 50 within the slot 40 and is straddled by the two screw bolts 52 the clamp force fixing the hasp 48 does not have any rotary component and thus does not transmit any torque about any diametric axis normal to the central axis 0—0 of the ball hole 46. Thus, the selected and desired angle of the brake shoe rod 60 remains fixed throughout the assembly of the brake shoe as well as during use.

In the preferred embodiment, the arm 12 and the clamp assembly are preferably formed of a high strength light weight material such as steel or aluminum. However, it is understood by those skilled in the art that other materials, such as titanium, could be used without departing from the spirit and scope of the invention. It is also preferred that the ball-shaped ring 44 be formed of a ductile material, such as brass, which would permit the ring 44 to compress tightly against the rod 60 to hold the brake shoe firmly in position upon adjustment as shown in FIG. 2.

The preferred brake assembly 10 of the present invention enables the brake shoe 56 to make even contact of its braking surface with the wheel rim and, therefore, proper application of a braking force which enhances the braking effect. The braking surface of the brake pad 62 is thus evenly worn and not subject to damage as with prior art brake assemblies.

The brake assembly 10 also permits attainment of proper adjustment of the brake shoe 56 radially for radial alignment with the tire rim R (FIG. 2), rotationally along the axis of the rod 50, rotationally in a plane perpendicular to the brake arm 16, and rotationally in a plane parallel to the brake arm. Also, inward adjustment toward the rim may be effected as the brake pad 62 wears.

From the foregoing description, it can be seen that the present invention comprises an improved cantilever brake assembly which is light in weight, inexpensive to manufacture, provides good braking and enables easy angular adjustment of a braking surface of a shoe body relative to a wheel rim, and easy adjustment of a clearance between the wheel rim and the brake shoe. It will be appreciated by those skilled in the art, that changes could be made to the embodiment described in the foregoing description without departing from the broad inventive concept thereof. It is understood, therefore, that this invention is not limited to the particular embodiment disclosed, but is intended to cover all modifications which are within the scope and spirit of the invention as defined in the appended claims.

What is claimed is:

1. A bicycle braking system, comprising:

an arm formed with an elongated slot mounted pivotally at one end on a front fork of a bicycle frame;

a ball having a hole extending through the center thereof;

a brake shoe having a front face provided with a brake pad and a rear face provided with a rod for insertion in the hole of said ball;

a U-shaped support hasp having a pair of spaced apart legs and having a curved inner surface for receiving said ball; and fastening means extending through said elongated slot and engaging each of the legs of the U-shaped hasp to secure the hasp to said arm and compressively lock said ball and brake shoe rod in selected position relative to the side wall rim of a wheel of a bicycle.

2. A bicycle braking system according to claim 1, wherein said elongated slot extends along the long axis of the arm; said arm and having a shelf along each of its longitudinal sides on which said ball rests, the fastening means extending through said slot and said ball and rod are adjustably secured therein.

3. A bicycle braking system according to claim 1 another having arm each arm being mounted pivotally to a respective leg of the front fork of the bicycle in transverse opposition to a side wall rim of the bicycle wheel.

4. The bicycle braking system according to claim 1; wherein said curved inner surface of said support hasp is semicircular in shape conforming to said ball.

5. The bicycle braking system according to claim 3; wherein said arms are further provided with a first end having a retaining notch for receiving a brake cable, and a second end having an annular support seat including an inner surface having a hole extending through a center thereof for mounting said arm to the bicycle frame.

6. The bicycle braking system according to claim 5; further including a washer having an inner surface and a hole extending through a center thereof for concentric alignment with said annular support seat and defining a hollow space therebetween, a spring unit disposed in said hollow space and having two ends that abut respectively said inner surfaces of said washer and said support seat, and a threaded bolt extending respectively through said hole in said washer, said spring unit, said hole in said support seat and a threaded hole in a support shaft of said bicycle frame.

7. The bicycle braking system according to claim 6; wherein said curved inner surface of said support hasp is semicircular in shape.

8. A bicycle braking device to be installed on a bicycle frame which has a bicycle wheel mounted rotatably thereto, comprising:

a curved brake arm formed with an elongated slot at an intermediate portion and including a first end having a retaining notch for receiving a brake cable and a second end having an annular support seat including an inner surface having a hole extending through a center thereof for pivotally mounting said arm on said bicycle frame;

a ball having a hole extending through a center thereof;

a brake shoe having a front face provided with a brake pad and a rear face provided with a rod being inserted in the hole of said ball;

a support hub having a plurality of threaded portions and a curved inner surface between said threaded portions for receiving said ball; and a plurality of threaded members extending through said elongated slot and respectively engaging said threaded portions, wherein said brake arm is pivotable so as to move said brake pad to contact said bicycle wheel in order to brake said bicycle wheel.

9. The bicycle braking according to claim 6; wherein said curved inner surface of said support hub is semicircular in shape.

* * * * *

UNITED STATES PATENT AND TRADEMARK OFFICE
CERTIFICATE OF CORRECTION

PATENT NO. : 5,503,252
DATED      : April 2, 1996
INVENTOR(S) : Mark Gelbein

It is certified that error appears in the above-identified patent and that said Letters Patent is hereby corrected as shown below:

Column 5, Claim 2, line 24:  change "aim" to --arm--.

Column 5, Claim 3, lines 29 and 30:  change "another having" to --having another--.

Signed and Sealed this

Second Day of July, 1996

BRUCE LEHMAN

Attest:

Attesting Officer

Commissioner of Patents and Trademarks